(12) United States Patent
Crocker

(10) Patent No.: US 8,721,443 B2
(45) Date of Patent: May 13, 2014

(54) SYSTEM AND METHOD FOR INTERACTION IN A VIRTUAL ENVIRONMENT

(75) Inventor: John Crocker, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 488 days.

(21) Appl. No.: 12/463,879

(22) Filed: May 11, 2009

(65) Prior Publication Data

US 2010/0285880 A1 Nov. 11, 2010

(51) Int. Cl.
*A63F 9/24* (2006.01)

(52) U.S. Cl.
USPC .................................. 463/36; 715/757

(58) Field of Classification Search
USPC .................................. 463/36; 715/757
See application file for complete search history.

(56) References Cited

U.S. PATENT DOCUMENTS

| | | | |
|---|---|---|---|
| 5,498,002 A * | 3/1996 | Gechter | 463/31 |
| 6,219,045 B1 * | 4/2001 | Leahy et al. | 715/757 |
| 7,244,181 B2 * | 7/2007 | Wang et al. | 463/42 |
| 2003/0177187 A1 * | 9/2003 | Levine et al. | 709/205 |
| 2004/0143852 A1 * | 7/2004 | Meyers | 725/133 |
| 2004/0153557 A1 * | 8/2004 | Shochet et al. | 709/229 |
| 2004/0175680 A1 * | 9/2004 | Hlavac et al. | 434/236 |
| 2004/0235564 A1 * | 11/2004 | Booth | 463/31 |
| 2006/0100018 A1 * | 5/2006 | Ganz | 463/42 |
| 2006/0148545 A1 * | 7/2006 | Rhyne et al. | 463/1 |

* cited by examiner

*Primary Examiner* — Matthew W Such
*Assistant Examiner* — Robert Carpenter
(74) *Attorney, Agent, or Firm* — Pillsbury Winthrop Shaw Pittman LLP

(57) ABSTRACT

A system and method for implementing game play are disclosed. In one embodiment, the method comprises defining, in a game play controller object, at least one game play rule of a virtual multiplayer game, maintaining, in the game play controller object, at least one game play state, maintaining, in a virtual object controller object, at least one state of a virtual object in a virtual multiplayer game environment, wherein the virtual object is one of a plurality of object types, receiving, over a network, user commands regarding the virtual object, and executing the game play rule based on the received instructions and the object type of the virtual object, wherein the execution of the game play rule modifies the game play state.

15 Claims, 5 Drawing Sheets

SYSTEM AND METHOD FOR INTERACTION IN A VIRTUAL ENVIRONMENT

BACKGROUND OF THE INVENTION

1. Field of the Invention

This disclosure relates to multiplayer online games.

2. Description of the Related Art

A virtual world is a computer-based simulated environment in which users interact. There currently is a need for improved systems for implementing game play in these simulated environments.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include a one or more object controllers and a game play controller.

One aspect of the disclosure is a method comprising defining, in a non-player object controller object, at least one game play rule of a virtual multiplayer game, maintaining, in the non-player object controller object, at least one state of the non-player object, maintaining, in a first player object controller object, at least one state of a first player object in a virtual multiplayer game environment, wherein the first player object is a first player object type, maintaining, in a second player object controller object, at least one state of a second player object in the virtual multiplayer game environment, wherein the second player object is second player object type different from the first player object type, receiving, over a network, first user commands regarding the first player object, executing the game play rule based on the first user commands, the state of the first player object, and the state of the non-player object, wherein execution of the game player rule modifies the state of the non-player object, receiving, over the network, second user commands regarding the second player object, and executing the game play rule based on the second user commands, the state of the second player object, and the state of the non-player object, wherein execution of the game play rule modifies the state of the non-player object.

Another aspect of the disclosure is a system comprising one or more virtual object controllers, each virtual object controller configured to maintain at least one state of a virtual object in a virtual multiplayer game environment, wherein each of the virtual objects is one of a plurality of virtual object types, and wherein at least a portion of the virtual objects are controlled by different players of the virtual multiplayer game, and a game play controller configured to maintain at least one game play state and to define at least one game play rule of the virtual multiplayer game, wherein the game play controller is configured to update the game play state based on information provided by the virtual object controllers, and wherein the game play controller is configured to implement a game play rule based on the virtual object types of virtual object controllers that have a defined relationship with the game play controller.

Another aspect of the disclosure is a method comprising defining, in a game play controller object, at least one game play rule of a virtual multiplayer game, maintaining, in the game play controller object, at least one game play state, maintaining, in a virtual object controller object, at least one state of a virtual object in a virtual multiplayer game environment, wherein the virtual object is one of a plurality of virtual object types, receiving, over a network, user commands regarding the virtual object, and executing the game play rule based on the received commands and the virtual object type of the virtual object, wherein the execution of the game play rule modifies the game play state.

DETAILED DESCRIPTION OF THE PREFERRED EMBODIMENT

The following detailed description is directed to certain specific aspects of the invention. However, the invention can be embodied in a multitude of different ways, for example, as defined and covered by the claims. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Similarly, methods disclosed herein may be performed by one or more computer processors configured to execute instructions retrieved from a computer-readable storage medium. A computer-readable storage medium stores information, such as data or instructions, for some interval of time, such that the information can be read by a computer during that interval of time. Examples of computer-readable storage media are memory, such as random access memory (RAM), and storage, such as hard drives, optical discs, flash memory, floppy disks, magnetic tape, paper tape, punch cards, and Zip drives.

Figure 1:
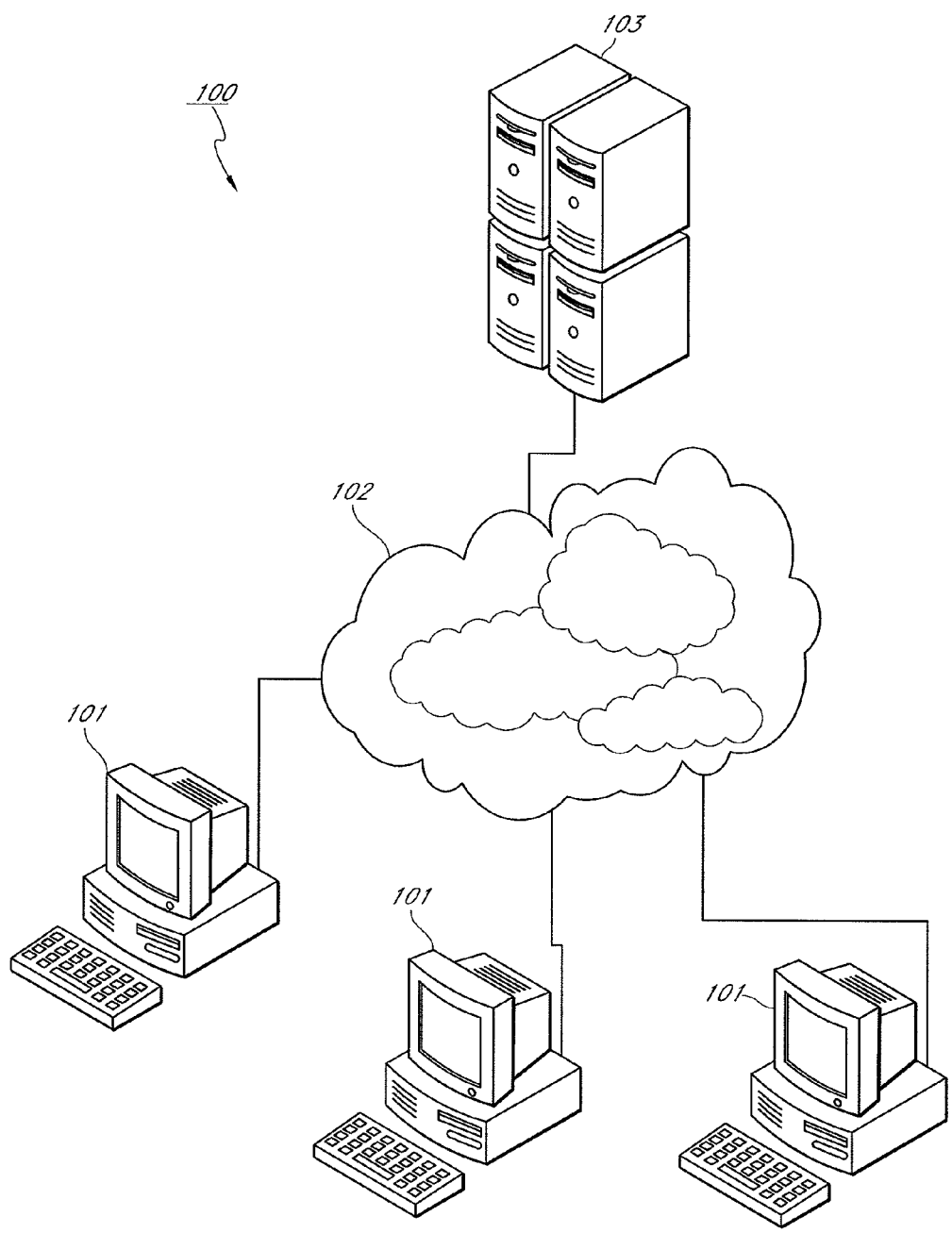
FIG. 1 is an illustration of a computer system.

FIG. 1 is an illustration of an exemplary computer system. The system 100 includes a number of system units 101 connected via a network 102, to a server 103. Users of the system units 101 can connect to the server 103 via the network 102 to interact with other users in a virtual world or with other objects of the virtual world. The interactions are defined by a plurality of game play rules stored on the server 103.

Each of the system units 101 can include a computer processor, memory and/or storage, one or more input devices, one or more output devices, and a network controller. The processor can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor such as an ARM, Pentium®, Pentium II®, Pentium III®, Pentium IV®, Pentium® Pro, an 8051, a MIPS®, a Power PC®, an ALPHA®, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processor can be coupled, via one or more buses, to read information from or write information to memory and/or storage. The processor may additionally, or in the alternative, contain memory, such as processor registers. The memory can include processor cache, including a multi-level hierarchical cache in which different levels have different capacities and access speeds. The memory can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

Each system unit can also include one or more input devices and one or more output devices for, respectively, receiving input from and providing output to, a user of the system unit. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

Each system unit 101 can also receive and transmit information over the network 102 via a network controller, or network card. The network card can be an Ethernet card with a unique 48-bit serial number called a MAC address stored in ROM (read-only memory) carried on the card. The network card can be an expansion card which plugs into a network bus or be a network interface built into a motherboard of the system unit.

As disclosed above, each system unit 101 of the system 100 is connected, via a network 102, to a server 103, and also to other system units 101. The network can include various forms of hardware and software technology including optical fiber, Ethernet, Wireless LAN, HomePNA, or power line communication. The network can be public access network, such as the Internet, or a private network. The network can communicate using a number of protocols known to those skilled in the art, including IPv4 or IPv6.

The server 103, like the system units 101, can include a processor, memory and/or storage, and a network interface. In some embodiments, the server 103 can include an application server, a database server, a file server, a standalone server, a client-server, or a Web server. Although the server may have one or more input or output devices in some embodiments, in other embodiments, the server lacks input or output devices.

As mentioned above, the server 103 may be an application server. An application server is a server that hosts an API (application programming interface) to expose logic and processes for use by third-party applications. The application server can be a Java application server or use the Microsoft .NET framework. The application server hosts an API containing a set of routines, data structures, object classes, and/or protocols provided by libraries and/or operating system services in order to provide an application to users accessing the application server via the network 102.

Figure 2:
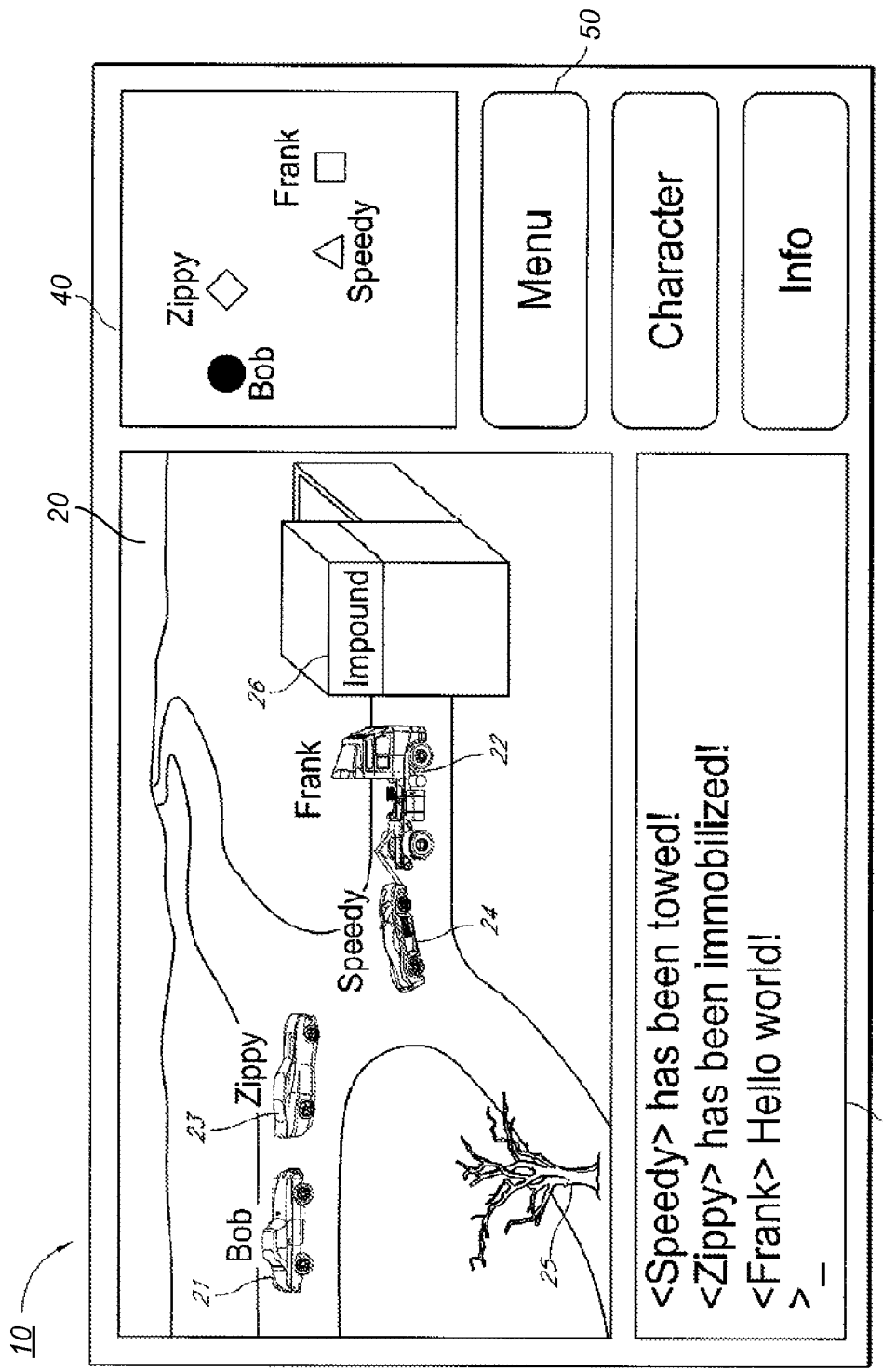
FIG. 2 is an exemplary screenshot of a virtual world.

FIG. 2 is an exemplary screenshot of a virtual world. The screenshot 10 contains a number of different windows, including a representation of the virtual world 20, an information window 30, a map window 40, and a number of clickable buttons 50. The representation of the virtual world 20 shows the location of a number of virtual objects in a simulated environment. The virtual objects can include player objects and non-player objects. The player objects, such as Bob 21 and Frank 22, are virtual objects that are controlled by users of the system. The non-player objects include non-player character objects, such as Zippy 23 and Speedy 24, as well as other virtual objects, such as tree 25 and building 26.

The users of the system, by controlling their respective player objects, interact with each other and the non-player objects. A user of the system can receive information regarding the virtual world which is displayed in the information window 30. The information regarding the virtual world can include information transmitted by other users to enable a chat feature. The information can also include events which have occurred at locations near the player object associated with the user. Information can also be displayed to the user graphically via the map window 40, which displays information regarding the location of various virtual objects in the virtual world.

In one embodiment, a first user associated with a first player object of a first player object type can interact with a non-player object so as to enable game play for a second user associated with a second player object of a second player object type. For example, in one implementation, the non-player character objects Zippy 23 and Speedy 24 are configured by default to move along a path in the virtual world. The non-player character objects 23, 24 can be immobilized via interaction from player objects of the first player object type. After being immobilized, the non-player character objects 23, 24 can be moved to building 26 via interaction from player objects of the second player object type.

This type of game play, called baton style game play or open quest style game play, allows players to implicitly join quests and participate in game play that affects other players and create game play for each other. As mentioned above, a player associated with a player object of a first player object type can perform an action on a non-player character object which will result in the non-player character object providing game play for a player having associated with a player object of a second player object type. Described below is a system for implementing such game play.

Figure 3:
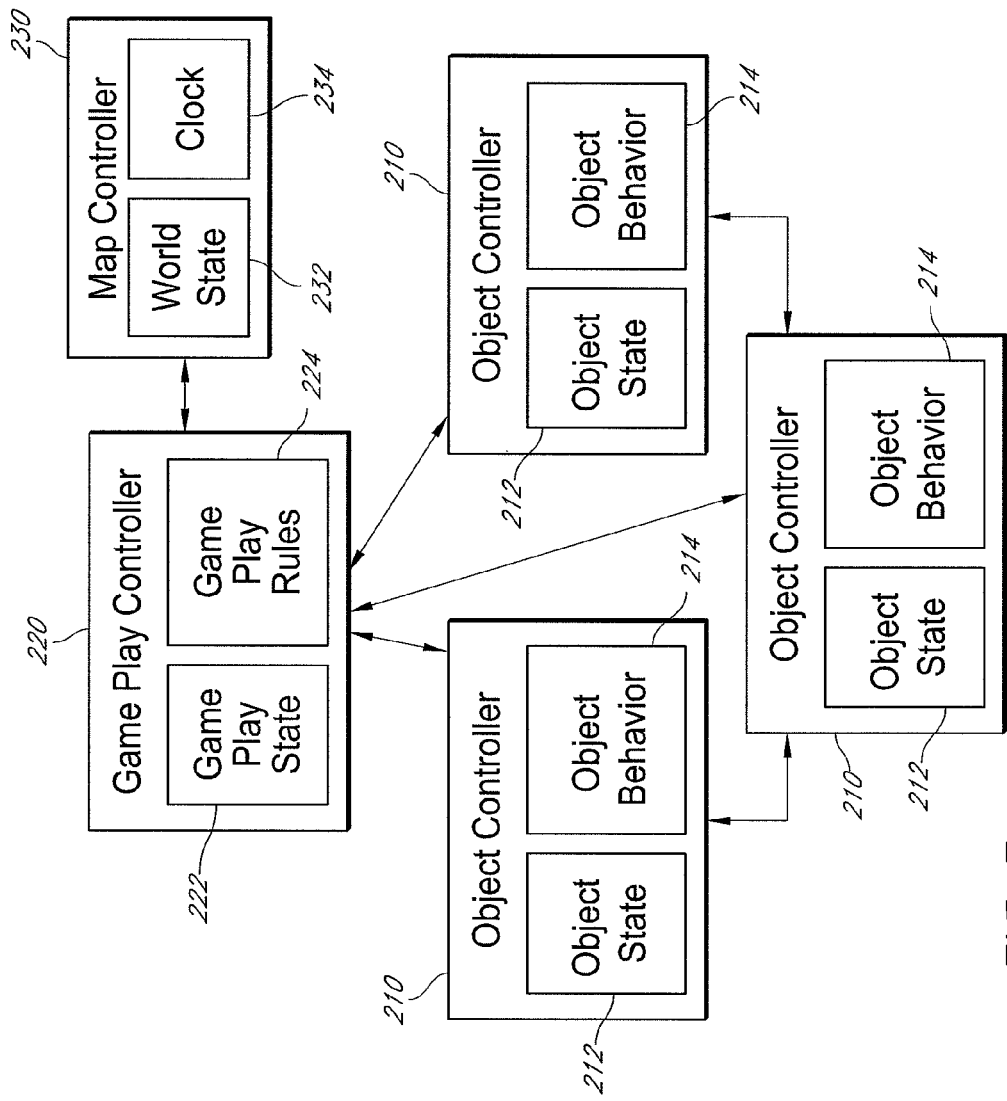
FIG. 3 is an illustration of a number of connected objects.

FIG. 3 is an illustration of a number of connected data objects. The data objects can be stored on the server 103 or the system units 101 of FIG. 1. In its simplest form, a data object is an allocated region of storage. In some embodiments, a data object includes data members that represent the data associated with the object and method members that represent processes for reading and modifying the data in predefined ways. A data object may also be characterized by an identifier which distinguishes it from other data objects.

In the illustrated embodiment of FIG. 3, the data objects include a game play controller object 210 operatively connected to a plurality of virtual object controller objects 220 and a map controller object 230. In other embodiments, there is more than one game play controller object 210.

Each virtual object controller object 210 is associated with a virtual object in the virtual world and includes one or more virtual object states 212 and one or more virtual object behaviors 214. The virtual object controller objects 210 can include player object controller objects associated with particular users of system units 101 connected to the server 103 via the network 102 of FIG. 1. Each player object controller object includes player state information. The player state information can include information regarding the player object, including an avatar selected by the user for interaction in the virtual world and information regarding items acquired by the user within the virtual world. The information regarding the player object can include a player object type, predetermined statistics regarding the player object type, or dynamic attributes of the player object which change via the game play mechanics and defined game play rules. The player state information can also include a location of the player object in the virtual world and an action being performed by the player object. The player state information can be altered by the user of a system unit 101 by transmitting commands via the network 102. The player state information can also be altered by other virtual object controller objects 210, the game play controller object 220, or via other mechanisms.

The virtual object controller objects 210 can also include non-player character (NPC) object controller objects generated at the system 103 of FIG. 1 or by the game play controller object 220. Each NPC object controller object includes NPC state information and NPC behavior, which can be written as a script. The NPC state information can include a location of an NPC object in the virtual world and an action being performed by the NPC object. The NPC state information can be altered by the NPC behavior, by the game play controller object 220, or by interaction with other object controller objects 210.

The game play controller object 220 defines one or more game play rules 224 and stores game play state information 222. The game play rules 224 can be written as scripts and can generate additional virtual object controller objects, such as NPC object controller objects. The game play rules 224 can include specific scripts for execution when an interaction with a player object controller object having specific player state information is detected. For example, different scripts can be executed when interaction with player controller objects having different player object types is detected. As another example, a specific script can be executed when interaction with a player object controller object having state information indicating that a specific item has been acquired by the user within the virtual world.

The map controller object 230 contains information accessible by the game play controller 220 relating the state of the virtual world. The map controller object 230 can include world state information 232 and a clock 234. By accessing this information, the game play controller object can execute scripts incorporating information relating to the state of the virtual world, or the time.

As mentioned above, each data object contains members that represent processes for reading and modifying the data of the data object in predefined ways. This feature can be used to implement specific types of game play, including the baton style game play described above. For example, a first player object controller object can store information indicative of a first player object type as a player object state. Similarly, a second player object controller object can store information indicative of a second play object type as a player object state. A game play controller object having game play rules defined therein can generate an NPC object controller object for the first and second player controller objects to interact with.

The generated NPC object controller object includes a NPC object state which is originally set to a default state in which the NPC object changes its location on a predefined path. When a first user associated with the first player object transmits commands via the network to move the player object, the player object controller object interprets these commands by altering the player object state within the player object controller object. When the location of the player object (as stored in the player object state of the player object controller object) is near to the location of the NPC object (as stored in the NPC object state of the NPC object controller object), the first user transmits commands to immobilize the NPC object. These commands are interpreted by the player object controller object to call a method member of the NPC object controller to change the NPC state from its default state to an immobilized state. The particular method member may check that certain criteria are met, including that the location of the first player object is near the NPC object, that the first player object is of a particular object type, and that the NPC object is in the default state. The particular method member can also call method members from the game play object controller to reward the user for accomplishing the task, which may include calling a method member of the player object controller object to change the player object state.

A second user associated with a second player object transmits commands via network to move the player object to the immobilized NPC object. When the location of the player object is near to the location of the NPC object, the second user transmits commands to move the NPC object. These commands are interpreted by the player object controller to call a method member of the NPC object controller to change the NPC state from its immobilized state to a move state. As mentioned above, the particular method member may check that certain criteria are met, including that the location of the second player object is near the NPC object, that the second player object is of a particular object type, and that the NPC object is in the immobilized state. The particular method member can also call method members from the game play object controller to reward the user for accomplishing the task, which may include calling a method member of the player object to change the player object state.

Figure 4:
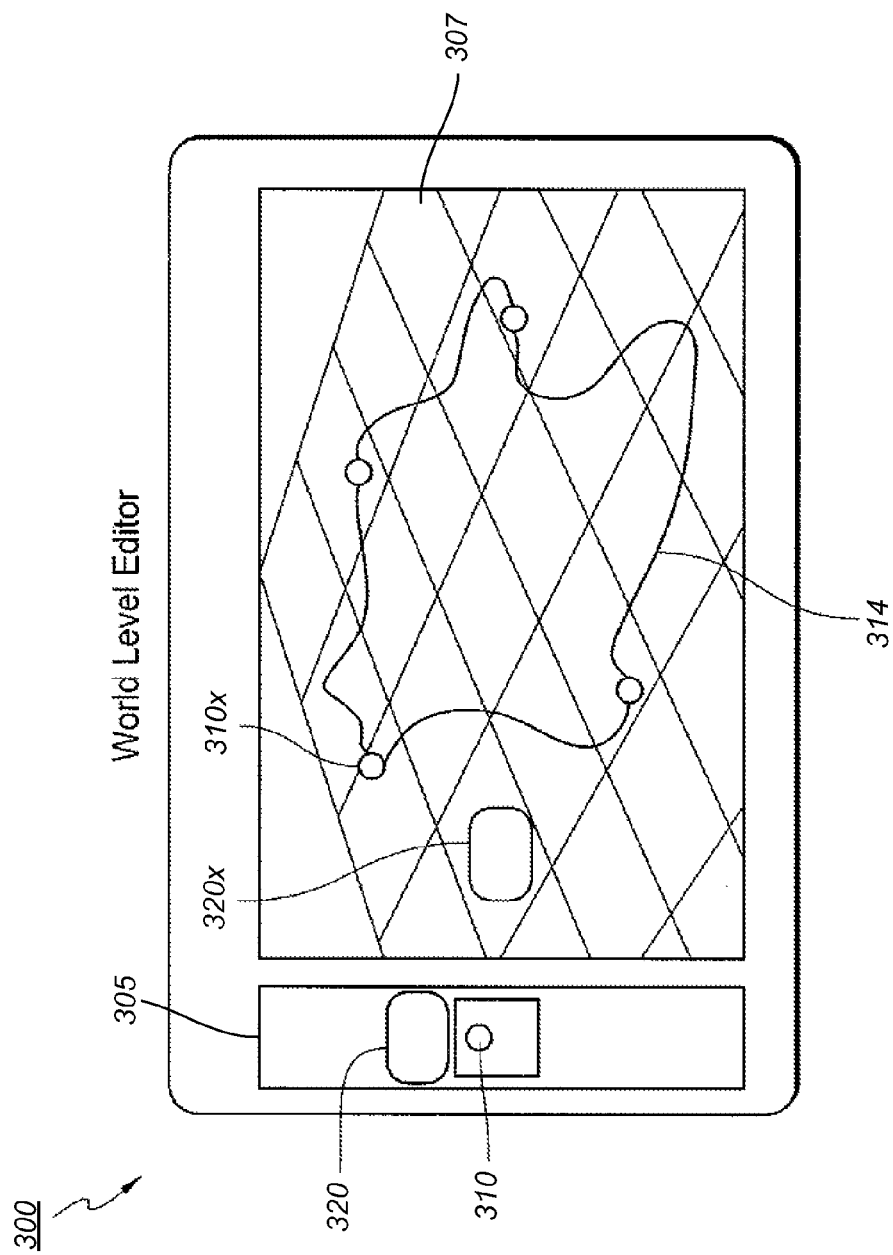
FIG. 4 is an exemplary screenshot of a virtual world editor.

FIG. 4 is an exemplary screenshot of a virtual world editor. The screenshot 300 illustrates a data object editing portion 305 and a location grid 307. In the illustrated embodiment, an editable representation of a game play controller object 320 is shown in the data object editing portion 305. The representation 320 can be dragged to the location grid 307 to define a location for the game play controller object, which can be stored in the game play state 222 of the game play controller object 220 of FIG. 3. This location can be displayed to an editor by the presence of a proxy 320x of the representation 320 displayed on the location grid 307. The representation 320 can also be manipulated so as to edit the underlying data object so as to define game play rules 224 stored in the game controller object 220 of FIG. 3.

As described above, the game play rules 224 can generate additional virtual object controller objects, such as NPC object controller objects. A representation of generated virtual object controller objects 310 is also displayed associated with the representation of the game play controller object 320 in the data object editing portion 305. The representation 310 can be manipulated so as to define object state 212 and object behavior 214 of the object controller object 210 of FIG. 3 represented by the representation. The object state 212 can be edited, at least in part, by dragging the representation 310 to a location on the location grid 307. This location can be displayed to an editor by the presence of one or more proxies 310x of the representation 310 displayed on the location grid 307. The object behavior 214 can similarly be edited by defining a path 314 on the location grid 307.

Figure 5:
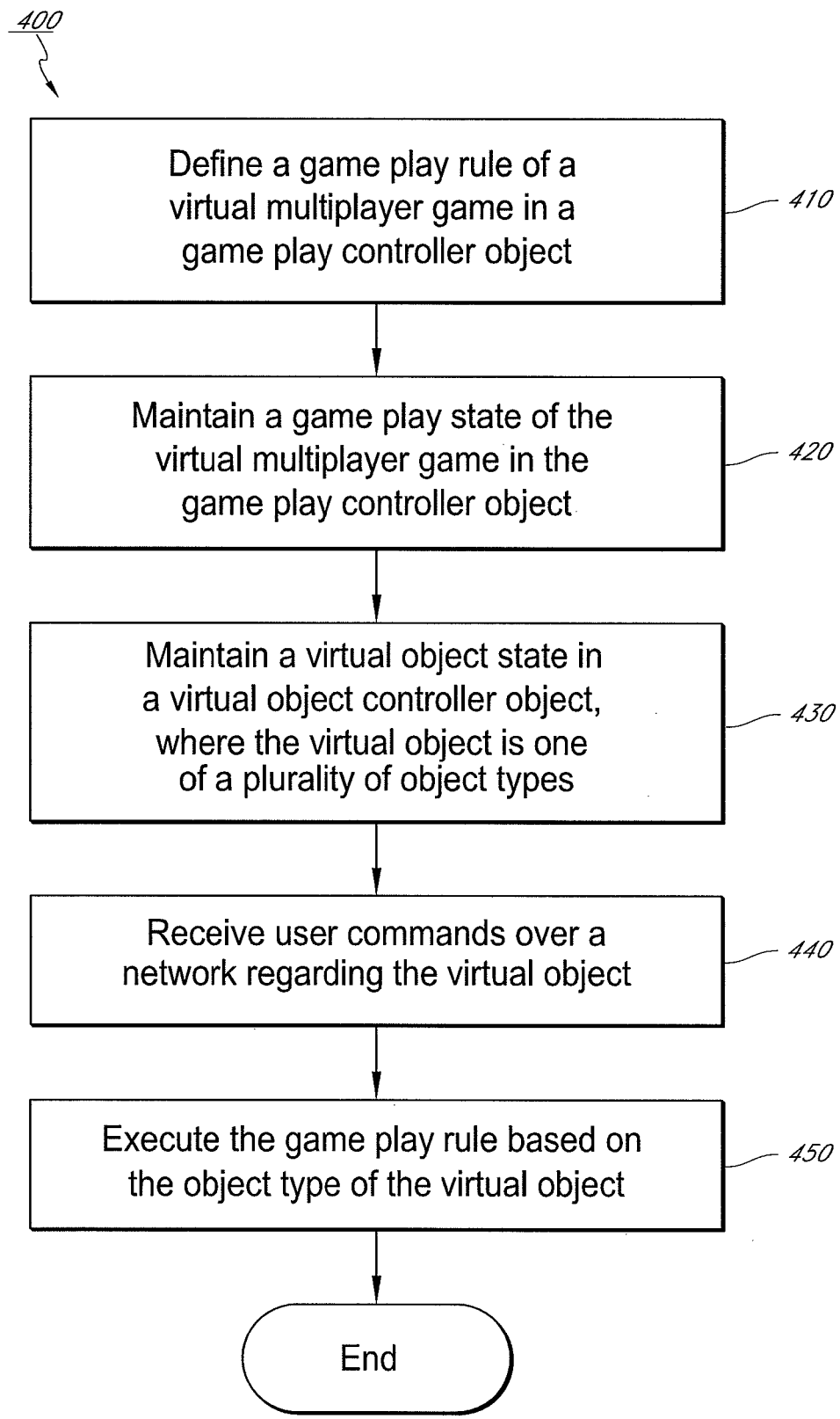
FIG. 5 is a flowchart illustrating a method of implementing game play rules.

FIG. 5 is a flowchart illustrating a method of implementing game play rules. By performing this process, one or more times, the user experiences game play. The process 400 begins, in block 410, by defining a game play rule of a virtual multiplayer game in a game play controller object. The game play rule can be defined by storing a script in the game play controller object, such as game play controller object 220 of FIG. 3. Non-limiting examples of usable scripting languages include Java and Python. The process 400 continues to block 420, where a game play state of the virtual multiplayer game is maintained in the game play controller object. The game play state can also be stored in the game play controller object 220 of FIG. 3.

Next, in block 430, a virtual object state is maintained in a virtual object controller object, wherein the virtual object is one of plurality of virtual object types. The virtual object state can be stored in the object controller object 210 of FIG. 3 and can include player object state information and NPC object state information. Player object state information can include, as described above, information regarding an avatar selected by the user for interaction in the virtual world and information regarding items acquired by the user within the virtual world. The information regarding the player object can include a player object type, predetermined statistics regarding the player object type, or dynamic attributes of the player object that changes via the game play mechanics and defined game play rules. The player object state information can also include a location of the player object in the virtual world and an action being performed by the player object. The NPC object state information can include a location of an NPC object in the virtual world and an action being performed by the NPC object.

Each of the virtual objects is one of plurality of virtual object types. The specific type of each virtual object can be stored as an object state 212 in the object controller object 210 of FIG. 3. The plurality of virtual object types can include a plurality of different avatar types selected by the user.

Proceeding to block 440, user commands are received over a network regarding the virtual object. The user commands can be transmitted over the network 102 of FIG. 1 by a system unit 101 associated with the user transmitting the commands. The user commands can be received by the server 103 of FIG. 1. In one embodiment, the user commands alter the virtual object state maintained in the virtual object controller object. For example, the user commands can alter a location of the virtual object stored in the virtual object controller object. In another embodiment, the user commands initiate an interaction between the virtual object controller object and a game play controller object.

Finally, in block 450, the game play rule is executed based on the object type of the virtual object. In one embodiment, the game play rule includes different scripts to be executed based on the object type of the virtual object. In another embodiment, the execution of the game play rule is further based on at least one of the virtual object states maintained in the virtual object controller object or the game play state maintained in the game play controller object.

While the above detailed description has shown, described, and pointed out novel features of the invention as applied to various aspects, it will be understood that various omissions, substitutions, and changes in the form and details of the device or process illustrated may be made by those skilled in the art without departing from the scope of this disclosure. As will be recognized, the invention may be embodied within a form that does not provide all of the features and benefits set forth herein, as some features may be used or practiced separately from others. The scope of this disclosure is defined by the appended claims, the foregoing description, or both. All changes which come within the meaning and range of equivalency of the claims are to be embraced within their scope.

What is claimed is:

1. A computer-implemented method implemented in a computer system comprising one or more processors, the method comprising:

storing, to non-transitory electronic storage accessible to the one or more processors, data objects that control virtual objects in a virtual environment, the data objects including data members that represent data associated with the data objects and method members that represent processes for reading and modifying the data of the data objects in predefined ways, the data objects being characterized by unique identifiers which distinguish it from other data objects, the data objects including:
  (i) a non-player object controller data object that controls a non-player virtual object in the virtual environment,
  (ii) a first player object controller data object that controls a first player controlled virtual object in the virtual environment, and
  (iii) a second player object controller data object that controls a second player controlled virtual object in the virtual environment;

defining, in a game play controller data object, at least one game play rule of a virtual multiplayer game that takes place in the virtual environment through interaction in the virtual environment between virtual objects including the first non-player virtual object, the first player controlled virtual object, and the second player controlled virtual object;

maintaining, in the stored non-player object controller data object, at least one state of the non-player virtual object;

maintaining, in the first player object controller data object, at least one state of the first player virtual object in the virtual environment, wherein the first player virtual object is a first virtual object type;

maintaining, in the second player object controller data object, at least one state of the second player virtual object in the virtual environment, wherein the second player virtual object is a second virtual object type different from the first virtual object type;

receiving, over a network, first user commands regarding the first player virtual object;

executing on the one or more processors the game play rule based on the first user commands, the state of the first player virtual object, and the state of the non-player virtual object, wherein execution of the game play rule modifies the state of the non-player virtual object;

receiving, over the network, second user commands regarding the second player virtual object; and executing one the one or more processors the game play rule based on the second user commands, the state of the second player virtual object, and the state of the non-player virtual object, wherein execution of the game play rule modifies the state of the non-player virtual object.

2. A system comprising:

non-transient electronic storage that stores data objects that control virtual objects in a virtual environment, the data objects including data members that represent data associated with the data objects and method members that represent processes for reading and modifying the data of the data objects in predefined ways, the data objects being characterized by unique identifiers which distinguish it from other data objects, the data objects including one or more virtual object controller data objects and a game play controller data object;

one or more processors, wherein the one or more processors are configured to maintain, in the individual virtual object controller data objects, at least one state of a virtual object in a virtual multiplayer game environment, wherein each of the virtual objects is one of a plurality of virtual object types, and wherein at least a portion of the virtual objects are controlled by different players of the virtual multiplayer game, and wherein the one or more processors are configured to maintain, in the game play controller data object, at least one game play state, wherein the game play controller data object defines, for the one or more processors, at least one game play rule of the virtual multiplayer game, wherein the one or more processors are configured to update, in the game play controller data object, the game play state based on information provided by the virtual object controller data objects, and wherein the game play controller data object is configured to cause the one or more processors to implement a game play rule based on the virtual object types of virtual object controller data objects that have a defined relationship with the game play controller data object.

3. The system of claim 2, further comprising a map controller stored to the non-transient electronic storage, the map controller being configured to cause the one or more processors to maintain at least one state of the virtual multiplayer game, wherein the game play controller data object is configured to cause the one or more processors to update the game play state based on information provided by the map controller.

4. The system of claim 2, wherein the at least one state of a virtual object comprises a location of the virtual object in the virtual multiplayer game environment.

5. The system of claim 2, wherein the at least one state of a virtual object comprises an indication of possession by the virtual object of one or more virtual items.

6. The system of claim 2, wherein the game play controller data object is further configured to cause the one or more processors to create one or more virtual object controller data objects, and wherein the one or more processors are configured to maintain, in the created one or more virtual object controller data objects, at least one state of a non-player controlled virtual object.

7. The system of claim 6, wherein the game play controller data object is configured to cause the one or more processors to implement the game play rule based on at least one state of a non-player controlled virtual object.

8. The system of claim 2, wherein the game play controller data object is configured to cause the one or more processors to implement a first portion of the game play rule based on a first virtual object type of a player-controlled virtual object and to implement a second portion of the game play rule based on a second virtual object type of a player-controlled virtual object.

9. The system of claim 2, further comprising a global controller data object configured to define, for the one or more processors, global game play rules of the virtual multiplayer game.

10. A computer-implemented method implemented in a computer system comprising one or more processors, the method comprising:

defining, in a game play controller data object stored to non-transient electronic storage that is accessible to the one or more processors, at least one game play rule of a virtual multiplayer game, wherein data objects control virtual objects in a virtual environment, the data objects including data members that represent data associated with the data objects and method members that represent processes for reading and modifying the data of the data objects in predefined ways, the data objects being characterized by unique identifiers which distinguish it from other data objects;

maintaining, in the game play controller data object, at least one game play state;

maintaining, in a virtual object controller data object stored to non-transient electronic storage that is accessible to the one or more processors, at least one state of a virtual object in a virtual multiplayer game environment, wherein the virtual object is one of a plurality of virtual object types;

receiving, over a network, user commands regarding the virtual object; and executing, on the one or more processors, the game play rule based on the received commands and the virtual object type of the virtual object, wherein the execution of the game play rule modifies the game play state.

11. The method of claim 10, wherein the at least one game play rule comprises a non-player character (NPC) generation rule which generates a NPC object controller data object specifying an NPC object state and an NPC virtual object behavior.

12. The method of claim 11, wherein the NPC virtual object behavior includes a first method member for changing the NPC object state from a first state to a second state based on a first virtual object type and a second method member for changing the NPC object state from the second state to a third state based on a second virtual object type.

13. The method of claim 10, wherein the at least one game play rule comprises a player reward rule.

14. The method of claim 10, wherein the at least one state of a virtual object comprises a location of the virtual object in the virtual multiplayer game environment.

15. A non-transient, computer-readable storage medium having instructions that cause one or more processors to implement a method, the method comprising:

storing, in non-transient storage accessible to the one or more processors, data objects that control virtual objects in a virtual environment, the data objects including data members that represent data associated with the data objects and method members that represent processes for reading and modifying the data of the data objects in predefined ways, the data objects being characterized by unique identifiers which distinguish it from other data objects, the data objects including a game play controller data object, and a virtual object controller data object that controls a virtual object within the virtual environment;

defining, in the game play controller data object, at least one game play rule of a virtual multiplayer game that takes place within the virtual environment;

maintaining, in the game play controller data object, at least one game play state of the virtual multiplayer game;

maintaining, in the virtual object controller data object, at least one state of the virtual object in the virtual environment, wherein the virtual object is one of a plurality of virtual object types;

receiving, over a network, user commands regarding the virtual object; and executing the game play rule based on the received commands and the virtual object type of the virtual object, wherein the execution of the game play rule modifies the game play state in the game play controller data object.

\* \* \* \* \*